(12) United States Patent
Francois et al.

(10) Patent No.: US 11,224,266 B2
(45) Date of Patent: Jan. 18, 2022

(54) EXTERNAL PART FOR A TIMEPIECE OR PIECE OF JEWELLERY

(71) Applicant: The Swatch Group Research and Development Ltd, Marin (CH)

(72) Inventors: Nicolas Francois, Neuchatel (CH); Claire Rannoux, Morges (CH); Stewes Bourban, Chabrey (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/758,331

(22) PCT Filed: Aug. 31, 2018

(86) PCT No.: PCT/EP2018/073425
§ 371 (c)(1),
(2) Date: Apr. 22, 2020

(87) PCT Pub. No.: WO2019/120645
PCT Pub. Date: Jun. 27, 2019

(65) Prior Publication Data
US 2020/0245732 A1    Aug. 6, 2020

(30) Foreign Application Priority Data
Dec. 21, 2017    (EP) ..................... 17209656

(51) Int. Cl.
*A44C 5/00*    (2006.01)
*G04B 45/00*    (2006.01)

(52) U.S. Cl.
CPC ........ *A44C 5/0084* (2013.01); *G04B 45/0015* (2013.01)

(58) Field of Classification Search
CPC ................ A44C 5/0084; A44C 27/001; G04B 45/0015; B82Y 30/00
See application file for complete search history.

(56) References Cited

U.S. PATENT DOCUMENTS 5,086,418 A * 2/1992 Marcus ............... A44C 5/0053
224/167
6,742,472 B1 * 6/2004 Shigyo ................... G01L 1/247
116/200
9,578,957 B2 * 2/2017 Patel .................. A46B 15/0012
(Continued)

FOREIGN PATENT DOCUMENTS

CN       104262404 A       1/2015
DE    102009035363 A1 *    2/2011    ........... G02F 1/0131
(Continued)

OTHER PUBLICATIONS

International Search Report dated Nov. 21, 2018 in PCT/EP2018/073425 filed Aug. 31, 2018, 3 pages.
(Continued)

*Primary Examiner* — Jack W Lavinder
(74) *Attorney, Agent, or Firm* — Oblon, McClelland, Maier & Neustadt, L.L.P.

(57) ABSTRACT

External part for a timepiece or piece of jewellery, this external part being produced by means of a polymer matrix in which piezochromic molecules are dispersed that change from a first stable state to a second stable state while changing colour under the effect of applied pressure.

20 Claims, 1 Drawing Sheet

(56) References Cited

U.S. PATENT DOCUMENTS

| | | | |
|---|---|---|---|
| 2008/0311401 A1 | 12/2008 | Letard et al. | |
| 2013/0011680 A1 | 1/2013 | Letard et al. | |
| 2014/0123702 A1* | 5/2014 | Pierce | A44C 15/00 63/40 |
| 2016/0170376 A1 | 6/2016 | Francois et al. | |
| 2018/0317616 A1 | 11/2018 | Francois | |
| 2018/0339829 A1* | 11/2018 | Bahar | G01L 5/0052 |
| 2020/0320920 A1* | 10/2020 | Sugiue | G09G 3/2003 |

FOREIGN PATENT DOCUMENTS

| | | |
|---|---|---|
| EP | 3 178 344 A1 | 12/2015 |
| EP | 3 035 132 A1 | 6/2016 |
| EP | 3 172 982 A1 | 5/2017 |
| EP | 3 173 455 A1 | 5/2017 |
| EP | 3 178 344 A1 | 6/2017 |
| JP | 4-297480 A | 10/1992 |
| JP | 2009-519879 A | 5/2009 |
| JP | 2009-128970 A | 6/2009 |
| JP | 2015-145110 A | 8/2015 |
| JP | 2016-114600 A | 6/2016 |
| WO | WO 2007/065996 A1 | 6/2007 |
| WO | WO 2017/092927 A1 | 6/2017 |

OTHER PUBLICATIONS

Office Action dated May 25, 2021 in corresponding Japanese Patent Application No. 2020-526137 (with English Translation), 8 pages.
Chinese Office Action issued in Chinese Patent Application No. 201880079925.6 dated Aug. 20, 2021 (w/ English translation).

* cited by examiner

EXTERNAL PART FOR A TIMEPIECE OR PIECE OF JEWELLERY

TECHNICAL FIELD OF THE INVENTION

The present invention relates to an external part for a timepiece or piece of jewellery. The present invention in particular relates to a bracelet intended to be fastened to a limb of a user, however is not limited thereto. This bracelet can be attached by itself to the limb of the user or can be used to attach a portable object such as a watch case to the limb of the user.

BACKGROUND OF THE INVENTION

Numerous bracelets are commercially available. This may include bracelets used by themselves as ornaments, or bracelets that are fastened to a portable object such as a watch case to allow such a portable object to be attached, for example, to the wrist of a user.

These bracelets are rigid or extendible. In a non-limiting manner, these bracelets can be made of leather, elastomer, fabric or even steel or ceramic. These bracelets can be formed by a plurality of links hinged to one another, or can be made using meshes or a strap for example made of fabric. The systems used to close these bracelets are also very diverse. For the purposes of illustration only, mention can be made of tongue and buckle clasps or unfolding buckle-type clasps.

Diverse in the mechanical structures thereof and the materials from which they are made, bracelets also differ from one another in colour and the decorative patterns with which they can be adorned. Nonetheless, the appearance of these bracelets cannot be modified after leaving the factory, such that all buyers acquiring, for example, a given watch model, own identical bracelets.

To overcome this drawback, in particular in the horology field, the marketing of certain watch models accompanied by a batch of interchangeable bracelets has already been proposed. Thus, depending on his mood, the user can swap a bracelet with another. This solution has the advantage of allowing the user to customise his/her wristwatch to a certain degree. Nonetheless, the degree of freedom available to the user when customising, for example, the bracelet of his/her watch remains limited to the replacement bracelets supplied thereto.

SUMMARY OF THE INVENTION

The purpose of the present invention is to overcome the aforementioned problems and others by proposing an external part for a timepiece or piece of jewellery, in particular but not limited to a bracelet that can be used by itself as an ornament or to attach a portable object such as a watch case to a limb of a user, that is of superior quality and that allows the user thereof to customise the bracelet at will. In particular, the invention aims to provide buyers with an external part that users can customise in any imaginable way.

For this purpose, the present invention relates to an external part for a timepiece or piece of jewellery, this external part being made by means of a polymer matrix in which piezochromic molecules are dispersed that change from a first stable state to a second stable state while changing colour under the effect of applied pressure.

Thanks to these features, the present invention provides an external part for a timepiece or piece of jewellery, in particular but not exclusively a bracelet used as an ornament or to attach a portable object, for example a wristwatch, to a wrist of a user, this external part being able to change colour when a mechanical pressure force is applied thereto. The appearance of the bracelet can thus be modified and customised either during manufacture or by the user.

According to one embodiment of the invention, the piezochromic molecules are synthesised so as to change state under the effect of an applied pressure greater than or equal to 50 $N \cdot m^{-2}$ (i.e. about 5 $kg \cdot cm^{-2}$). Thus, small impacts occurring in everyday life corresponding to pressures below this threshold will not cause the piezochromic molecules to change colour. However, this threshold value is low enough for a user to cause the piezochromic molecules to change from the first state thereof to the second state thereof without the need to use complex tooling.

According to another embodiment of the invention, the piezochromic molecules are dispersed in the matrix in a proportion that lies in the range 2 wt % to 20 wt % depending on the desired colour change effect.

According to another embodiment of the invention, the piezochromic molecules are a spin transition effect nanomaterial or nanometric material. Compared to other piezochromic materials, piezochromic nanomaterials undergo volume contraction and electron transition phenomena under a low pressure (of about several bar), which eases the colour change.

In one advantageous case, the piezochromic molecules are a pressure-induced spin transition effect nanomaterial on which an irreversible colour change is produced.

In another advantageous case, the piezochromic molecules are a pressure-induced spin transition effect nanomaterial on which a colour change is produced that can be reversed by hysteresis.

In the case of piezochromic molecules undergoing a reversible colour change, they can be brought back to their initial state by applying heat.

According to yet another embodiment of the invention, the matrix is formed by an organic or inorganic polymer resin.

In one advantageous case, the matrix is formed by an elastomer resin, the hardness whereof lies in the range 50 shore A to 90 shore D.

In another advantageous case, the matrix is formed by a thermoplastic elastomer resin.

In another advantageous case, the thermoplastic elastomer resin is selected from the group consisting of thermoplastic polyurethanes, thermoplastic styrenic elastomers, thermoplastic copolyesters and thermoplastic copolyamides.

In one advantageous case, the matrix is formed by a vulcanizable elastomer selected from the group consisting of fluorinated ethylene propylene (FEP) rubbers and silicones, acrylic-nitrile-butadiene polymer rubbers (NBR), hydrogenated nitrile rubbers (HNBR) and fluorocarbon (FKM) rubbers.

According to one embodiment of the invention, the polymer matrix is pre-mixed with at least one coloured additive allowing the initial colour of the matrix to be combined with that generated by the piezochromic effect.

In one advantageous case, the coloured additive is selected from the group consisting of translucent, fluorescent and/or phosphorescent dyes as well as metallic- or pearl-effect pigments.

BRIEF DESCRIPTION OF THE FIGURES

Other features and advantages of the present invention will be better understood upon reading the following detailed description of one example of an external part according to the invention, this example being provided for the purposes of illustration only and not intended to limit the scope of the invention, given with reference to the accompanying drawing, wherein.

DETAILED DESCRIPTION OF ONE EMBODIMENT OF THE INVENTION

The present invention was drawn from the general inventive idea consisting of producing an external part for a timepiece or piece of jewellery, in particular but not limited to a bracelet, by means of a polymer matrix in which piezochromic molecules are dispersed and which are able to change colour under the application of mechanical pressure. The appearance of the bracelet can thus be modified during manufacture or by the user by pressing using a finger or a tool, for example of the stylus type. More specifically, the pressure-sensitivity of the piezochromic molecules can be adjusted during the synthesis thereof so that this sensitivity is high enough to prevent the external part from changing appearance at the slightest impact that could arise from everyday use, but low enough for the forces that must be applied to induce such a change in appearance to be compatible with those of the user. Depending on the type of piezochromic molecules used, the colour change can be irreversible or can show hysteresis, allowing it to return to the initial state thereof, for example by applying heat. The user can thus modify and customise the external part according to the invention at will and thus have an external part with a unique appearance. This customisation can take place using fingers, a stylus or other convex object, or even by means of a punch supplied by the manufacturer which can be freely applied by the user or in a pattern proposed by the manufacturer. The degree of freedom available to the user when customising the external part is thus complete; the user can apply a decoration, a logo, a trademark, or even a signature to the external part, which can be transcribed either by means of a stylus, or by means of a shaped punch which can be supplied thereto by the manufacturer of the external part. The invention is also of interest for manufacturers who can only produce a single type, or a limited number of different types of external parts, and who can leave the user to complete the final decoration.

The piezochromic molecules or compounds are preferably spin transition effect nanomaterials such as, for example, those disclosed in the international patent application WO 2007/065996 A1. These piezochromic compounds have the ability to change colour when mechanical pressure is applied thereto. This colour change is usually explained by a change in the spatial arrangement of the piezochromic molecules which change from a relaxed state to a compressed state. The piezochromic pigment used can also be based on 9,10-bis((E)-2-(pyrid-2-yl(vinyl(anthracene) (BP2VA) known for changing colour from green ($\lambda$=528 nm) to orange/red ($\lambda$=590 nm), or based on 11-(3'-Oxodihydrobenzothiophen-2'-ylidene)cyclopenta[1,2-b:4,3-b'] dibenzothiophene known for changing colour from red ($\lambda$=600 nm) to black ($\lambda$=750 nm).

Figure 1A:
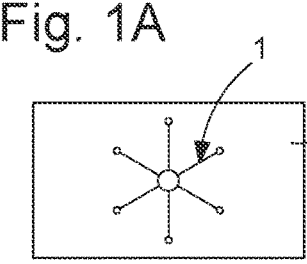
FIG. 1A to 1C show the behaviour of a piezochromic molecule that changes, in an irreversible manner, from a first stable state wherein it has a first colour, to a second stable state wherein it has a second colour under the effect of mechanical pressure.
Figure 1B:
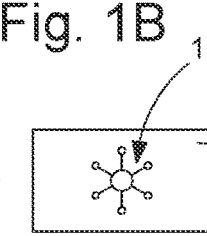
Figure 1C:
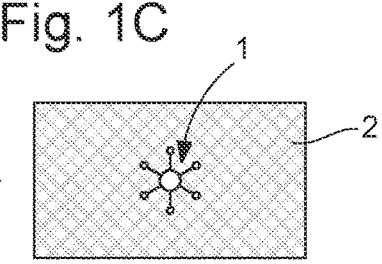

FIG. 1A to 1C show the behaviour, under the application of mechanical pressure, of a piezochromic molecule 1 embedded in a polymer matrix which forms an external part 2 for a timepiece or piece of jewellery, in particular but not exclusively a bracelet. In FIG. 1A, the piezochromic molecule 1 is in the initial relaxed, stable state thereof. In FIG. 1B, mechanical pressure is exerted on the external part 2, which is compressed, which causes a corresponding compression of the piezochromic molecule 1. In FIG. 1C, the mechanical pressure on the external part 2 is released and the latter recovers the initial shape thereof. However, the piezochromic molecule 1 has irreversibly changed from the first stable state thereof, wherein it is relaxed and has a first colour, to a second stable state wherein it is compressed and has a second colour.

Figure 2A:
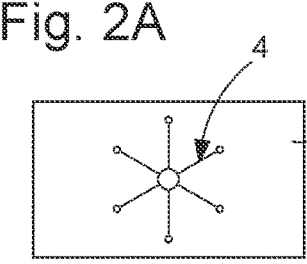
FIG. 2A to 2C show the hysteretic behaviour of a piezochromic molecule that changes, in a reversible manner, from a first stable state wherein it has a first colour, to a second stable state wherein it has a second colour under the effect of mechanical pressure, and which can return to the initial stable state thereof by the application of heat.
Figure 2B:
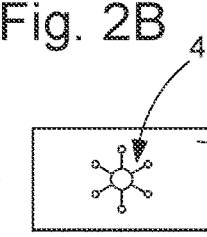
Figure 2C:
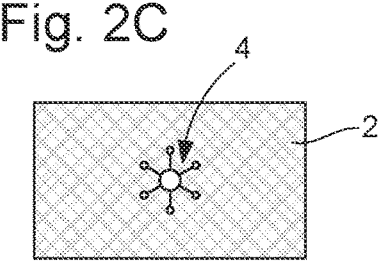

FIG. 2A to 2C show the hysteretic behaviour of a piezochromic molecule 4 which, under the application of mechanical pressure (FIG. 2B), reversibly changes from a first stable state, wherein it is relaxed and has a first colour (FIG. 2A), to a second stable state wherein it is compressed and has a second colour (FIG. 2C). The reference numeral 6 in FIG. 2C shows that, under the application of heat, the piezochromic molecule 4 returns to the initial relaxed state thereof.

Figure 3:
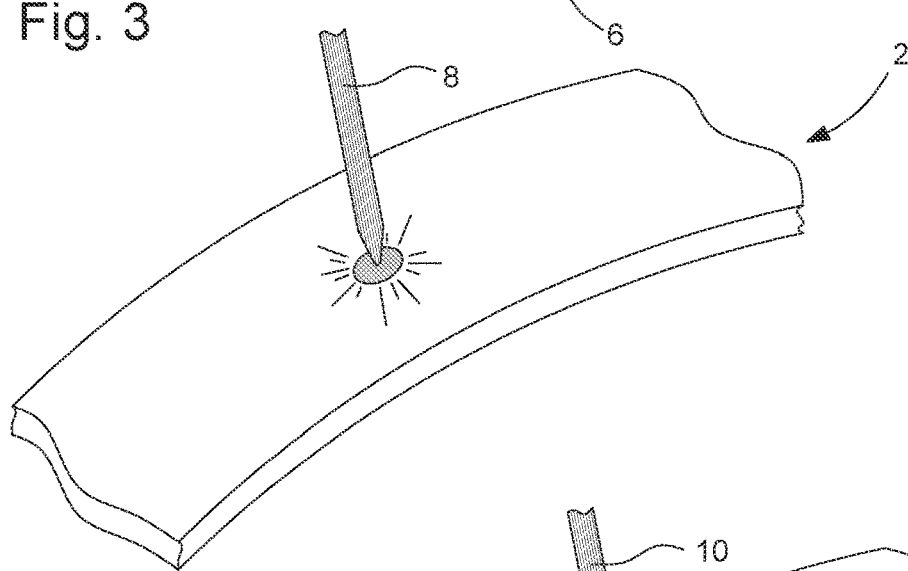
FIG. 3 shows the customisation of the external part by applying mechanical pressure using a stylus.

FIG. 3 shows the customisation of the external part 2 by applying mechanical pressure using a tool such as a stylus 8. By locally pressing down on the external part 2 using the stylus 8, the matrix and the piezochromic molecules embedded in this matrix are compressed. Under the effect of this compression, the piezochromic molecules change, in a reversible or irreversible manner, from the initial relaxed, stable state thereof to the final compressed state thereof while changing colour. It is thus possible, by changing the colour of the external part in some places, to create a unique decoration on this external part which will not correspond to that of any other user.

Figure 4:
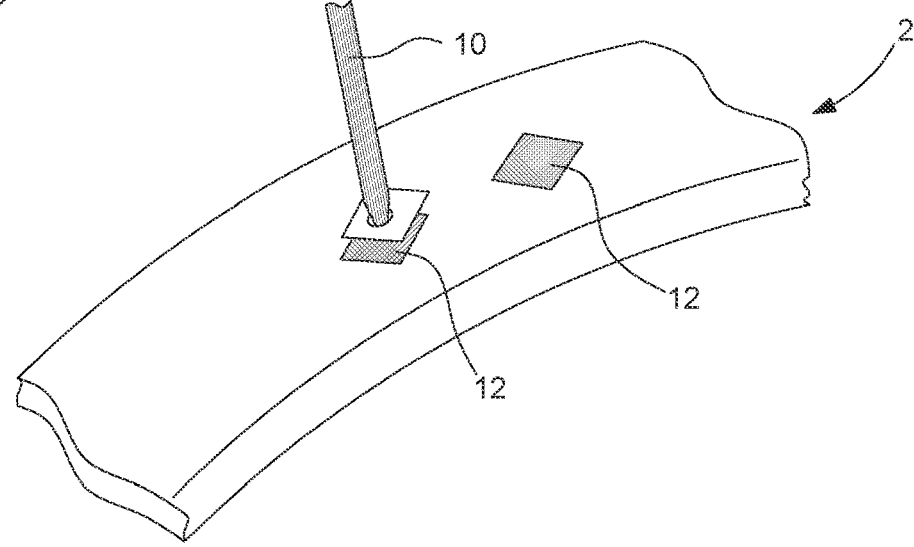
FIG. 4 shows the customisation of the external part according to the invention by applying mechanical pressure using a shaped punch.

Alternatively, FIG. 4 shows the customisation of an external part 2 according to the invention using a shaped punch 10 bearing an elementary pattern 12 and which can be supplied by the manufacturer of the external part 2. Depending on the number of times the elementary pattern 12 of the shaped punch 10 will be reproduced on the external part 2 and the manner in which these elementary patterns will be disposed relative to one another, an original decoration can be created that does not correspond to that of any other user.

It goes without saying that the present invention is not limited to the embodiment described above and that various simple alternatives and modifications can be considered by a person skilled in the art without leaving the scope of the invention as defined by the accompanying claims. In particular, it is understood that, although the invention has been described with reference to a bracelet worn as a jewellery ornament or used to fasten a portable object, in particular a watch case, to a wrist of a user, the invention relates to any other type of external part for a timepiece or piece of jewellery such as, in particular, a bezel or a middle part of a watch case, a ring, a clasp or other element.

NOMENCLATURE

1. Piezochromic molecule
2. External part

4. Piezochromic molecule
6. Application of heat
8. Stylus
10. Shaped punch
12. Elementary pattern

The invention claimed is:

1. An external part of a timepiece or piece of jewelry, comprising:
a polymer matrix in which piezochromic molecules are dispersed,
wherein the piezochromic molecules change from a first stable state to a second stable state while changing color under the effect of applied pressure.

2. The external part according to claim 1, wherein the piezochromic molecules change state under the effect of an applied pressure greater than or equal to 50 N·cm$^{-2}$ on the external part.

3. The external part according to claim 2, wherein the piezochromic molecules are dispersed in the matrix in a proportion that lies in the range 2 wt % to 20 wt % depending on the desired color change effect.

4. The external part according to claim 1, wherein the piezochromic molecules are dispersed in the matrix in a proportion that lies in the range 2 wt % to 20 wt % depending on the desired colour change effect.

5. The external part according to claim 1, wherein the piezochromic molecules are a spin transition effect nanomaterial.

6. The external part according to claim 5, wherein the spin transition effect nanomaterial is arranged to change colour under the effect of pressure in a manner that can be reversed by hysteresis.

7. The external part according to claim 6, wherein the piezochromic molecules return to the first initial stable state by applying heat.

8. The external part according to claim 1, wherein the piezochromic molecules are a spin transition effect nanomaterial which is arranged so as to irreversibly change colour under the effect of pressure.

9. The external part according to claim 1, wherein the matrix is formed by an organic or inorganic polymer resin.

10. The external part according to claim 9, wherein the matrix is formed by an elastomer resin, the hardness thereof lying in the range 50 shore A to 90 shore D.

11. The external part according to claim 10, wherein the matrix is formed by a thermoplastic elastomer resin.

12. The external part according to claim 11, wherein the thermoplastic elastomer resin is selected from the group consisting of thermoplastic polyurethanes, thermoplastic styrenic elastomers, thermoplastic copolyesters and thermoplastic copolyamides.

13. The external part according to claim 9, wherein the matrix is formed by a thermoplastic elastomer resin.

14. The external part according to claim 10, wherein the matrix is formed by a vulcanizable elastomer selected from the group consisting of fluorinated ethylene propylene rubbers and silicones, acrylic-nitrile-butadiene polymer rubbers, hydrogenated nitrile rubbers and fluorocarbon rubbers.

15. The external part according to claim 13, wherein the thermoplastic elastomer resin is selected from the group consisting of thermoplastic polyurethanes, thermoplastic styrenic elastomers, thermoplastic copolyesters and thermoplastic copolyamides.

16. The external part according to claim 9, wherein the matrix is formed by a vulcanizable elastomer selected from the group consisting of fluorinated ethylene propylene rubbers and silicones, acrylic-nitrile-butadiene polymer rubbers, hydrogenated nitrile rubbers and fluorocarbon rubbers.

17. The external part according to claim 1, wherein the polymer matrix is pre-mixed with at least one colored additive allowing the initial color of the matrix to be combined with the color generated by the piezochromic effect.

18. The external part according to claim 17, wherein the colored additive is selected from the group consisting of translucent, fluorescent and/or phosphorescent dyes as well as metallic- or pearl-effect pigments.

19. An external part for a timepiece or piece of jewelry, comprising:
a polymer matrix in which piezochromic molecules are dispersed,
wherein the piezochromic molecules change from a first stable state to a second stable state while changing color under the effect of applied pressure, and
wherein the matrix is formed by an elastomer resin, the hardness thereof lying in the range 50 shore A to 90 shore D.

20. The external part according to claim 19, wherein the piezochromic molecules change state under the effect of an applied pressure greater than or equal to 50 N·cm$^{-2}$ on the external part.

* * * * *